US008477218B2

(12) United States Patent
Chammings

(10) Patent No.: US 8,477,218 B2

(45) **Date of Patent: *Jul. 2, 2013**

(54) METHOD FOR CORRECTING THE SPACE NOISE OF AN IMAGE SENSOR BY LUMINESCENCE LIMITATION

(75) Inventor: Gilles Chammings, Grenoble (FR)

(73) Assignee: Commissariat a l'Energie Atomique, Paris (FR)

(*) Notice: Subject to any disclaimer, the term of this patent is extended or adjusted under 35 U.S.C. 154(b) by 425 days.

This patent is subject to a terminal disclaimer.

(21) Appl. No.: 12/594,191

(22) PCT Filed: Mar. 28, 2008

(86) PCT No.: PCT/EP2008/053760

§ 371 (c)(1), (2), (4) Date: Feb. 12, 2010

(87) PCT Pub. No.: WO2008/125462

PCT Pub. Date: Oct. 23, 2008

(65) Prior Publication Data

US 2010/0134659 A1 Jun. 3, 2010

(30) Foreign Application Priority Data

Mar. 30, 2007 (FR) ...................................... 07 02349

(51) Int. Cl.
*H04N 5/217* (2011.01)

(52) U.S. Cl.
USPC ............ 348/241; 348/235; 348/251; 382/262

(58) Field of Classification Search
USPC ............... 348/235, 241, 222, 1, 251; 382/262
See application file for complete search history.

(56) References Cited

U.S. PATENT DOCUMENTS

| | | | | |
|---|---|---|---|---|
| 6,151,417 | A | 11/2000 | Florent | |
| 2006/0045377 | A1* | 3/2006 | Kawai | 382/274 |
| 2007/0047834 | A1 | 3/2007 | Connell | |
| 2010/0231756 | A1* | 9/2010 | Chamming's | 348/241 |

FOREIGN PATENT DOCUMENTS

| | | | |
|---|---|---|---|
| EP | 0 751 483 | A | 1/1997 |

* cited by examiner

*Primary Examiner* — Sinh Tran
*Assistant Examiner* — Paul Berardesca
(74) *Attorney, Agent, or Firm* — LaRiviere, Grubman & Payne, LLP

(57) ABSTRACT

The invention relates to matrix image sensors, and it relates more particularly to a method for correcting the fixed spatial noise of the matrix.
The signal ($S_{ij,n}$) obtained from each pixel ($P_{ij}$) during a large number of successive images is collected; for each pixel, an approximate value ($M_{ij}$) of an average of the signal obtained from the pixel during this large number of images is determined; the signal obtained from each pixel is corrected by adding to it the difference between a reference average value (M0) and the approximate average value. The approximate average is obtained by determining high and low limit values taken by the signal obtained from the pixel during the large number of images, and by calculating a median between these high and low limit values.

10 Claims, 2 Drawing Sheets

ADDa
ADD0
ADD0'
ADD1
ADD1'
ADDb
ADDc
ADDd
R0
R1
R2
R3
R'1
R'2
R'3
ACT
M0
MUX
BS
ADRij

METHOD FOR CORRECTING THE SPACE NOISE OF AN IMAGE SENSOR BY LUMINESCENCE LIMITATION

PRIORITY CLAIM

This application claims priority to PCT Patent Application Number PCT/EP2008/053760, entitled Method for Correcting the Space noise of an Image Sensor by Luminescence Limitation, filed on Mar. 26, 2008.

FIELD OF THE INVENTION

The invention relates to matrix image sensors, and it relates more particularly to a method for correcting the spatial noise generated by the dispersion of the physical properties of the various individual sensitive dots, or pixels, of the matrix. This spatial noise is particularly significant in the case of infrared image sensors, whether they are photovoltaic element sensors, which measure currents generated by infrared radiation, or bolometric element sensors, which measure a temperature resulting from heating produced by the radiation.

BACKGROUND OF THE INVENTION

The spatial noise generates a spurious image which degrades the wanted image or even renders it unusable: assuming that the scene observed by the sensor is an image of uniformly average luminance, the sensor provides a non-uniform image, which is unacceptable if this non-uniformity exceeds a certain degree; furthermore, the observed image depends on the level of this uniform luminance, which renders this noise yet more problematic since the difference in the behavior of two pixels depends on the luminance that they receive.

The behavior of the pixels differs from one pixel to another not only with regard to the signal level produced for a reference luminance level, but also with respect to the growth slope and general appearance (for simplicity: the curvature) of the response curve of the pixel according to the luminance.

To minimize the spatial noise generated in this way in a matrix sensor, it has already been proposed to record the output signal levels from the various pixels for a uniform image of given luminance and to individually offset the signal level of each pixel so that all the pixels are brought to one and the same reference (first order correction). It has also been proposed to record the levels for two uniform luminance levels, in order to correct not only the level offset but also the slope of variation (second order correction).

These methods require manual calibration based on one or two uniform images exhibiting reference luminances, which is awkward; moreover, this calibration must be redone if the spatial noise drifts over time.

Finally, it has been proposed to perform corrective calculations of each of the dots of the collected image, based on the observation of a large number of successive images, by applying the hypothesis that the statistical average and the statistical variance of the light levels received by a pixel is the same for all the pixels because of the diversity of the images received over time. Thus, the average of the received signals is calculated in time for each pixel and a correction is performed on the current signal from the pixel to offset the current level by a value corresponding to the deviation between the average detected for this pixel and a reference average value common to all the pixels. This brings the average level of all the signals to the same reference value.

Similarly, the variance is calculated for each pixel over a large number of images, this variance being somewhat representative of an approximation of the slope of the curve of variation of the signal level as a function of the luminance, and a gain correction is applied to the current signal variations, the correction being the deviation between the calculated variance and a reference variance common to all the pixels. This brings the slope of variation of each pixel to one and the same reference value.

This solution is very advantageous since it requires no calibration based on patterns.

However, these calculations are very cumbersome since they require a large number of images to be collected, all of them to be stored, average calculations to be done for each pixel over this large number of images, and variance calculations on each pixel. In practice, this can be performed only by a powerful computer, on series of prestored images. The image could not be collected and processed directly in the photographing camera. Consequently, although this solution can theoretically be used to process images off line, it is not at all applicable for an instantaneous shot.

The invention proposes a solution to overcome this difficulty.

SUMMARY OF THE INVENTION

The invention proposes a method of automatically calibrating the response of the various pixels of a matrix sensor to eliminate the spatial noise due to the non-uniform response of the various pixels. The inventive method is a method of processing signals obtained from the pixels of a matrix image sensor, comprising the following steps:

- the signal obtained from each pixel during a large number of successive images is collected;
- for each pixel, an approximate value of an average of the signal obtained from the pixel during this large number of images is determined;
- the signal obtained from each pixel is instantaneously corrected according to the determined approximate average value and a reference average value common to all the pixels, characterized in that the approximate average is obtained by determining high and low limit values taken by the signal obtained from the pixel during the large number of images, and by calculating a median between these high and low limit values.

The first-degree correction consists in adding to the signal the difference between the approximate average and the reference average. The half-sum of the high and low limit values can be taken as the approximate average value.

Preferably, the calculation of the approximate average and the correction of the signal are performed, for each pixel, in an individual electronic circuit associated with the pixel, and the corrected signals corresponding to each pixel are extracted from a matrix of associated circuits. There is therefore a matrix of associated circuits, which is either combined with the matrix of photodetectors, the associated circuit being integrated in the matrix of photodetectors, or juxtaposed to the matrix of photodetectors. The correction is preferably a digital correction.

The high and low limit values are preferably calculated digitally by a recursive method. A recursive digital method should be understood to be a method of calculating a function $F_N(x_1, x_2, x_3, \ldots x_n \ldots x_N)$ of N variables $x_n$ of rank n varying from 1 to N, in which the starting point is a value $F_n$ found for this function by using the first n variables and the value $F_{n+1}$ is calculated for n+1 variables by a function of $F_n$ and the added variable $x_{n+1}$:

$$F_{n+1}=R(F_n, x_{n+1}).$$

Such a method progressively culminates in the calculation of $F_N$ and is not limited by the value of N since it can continue as N increases.

The high limit value used in calculating the average can be obtained quite simply by comparing the uncorrected signal value obtained from each pixel with the content of a high limit value register and by replacing the content of the register with the value of the received signal if said value is greater than the content of the register. For the low limit value, the procedure is symmetrical with a low limit value register which receives the value of the received signal if said value is smaller than the content of the register.

It is also possible to calculate a high limit value in a more sophisticated recursive manner, by the following algorithm:

- if the value of the signal from the pixel for the current image is greater than the high limit value, the high limit value is modified to add to it a fraction of the difference between the value of the signal and the limit value;
- if the value of the signal from the pixel is less than the limit value, a fraction of the difference between the high and low limit values is subtracted from this value.

An approximation of high and low limit values is obtained, which has the benefit of eliminating aberrant dots and which therefore corresponds better to a statistical evaluation of the signal variation amplitude, common to all the pixels.

For the low limit value, the procedure is symmetrical.

In addition to the additive corrections that have just been mentioned and that consist in adding to the signal the difference between a reference average value and a calculated average value, it is also possible to provide at the pixel level a multiplying correction using a multiplying coefficient which modifies the slope of variation of the signal according to the luminance, the multiplying coefficient being the ratio between a desired reference deviation and the deviation observed between the high and low limit values.

In addition to the correction method that has just been summarized, the invention relates to a matrix image sensor comprising, for each pixel, an individual digital circuit associated with the pixel, this individual circuit comprising:

- means for calculating an approximate value of an average of the signal obtained from the pixel during a large number of preceding images, the average being obtained by determining high and low limit values taken by the signal obtained from the pixel during the large number of images and by calculating a median between these high and low limit values,
- means for correcting the signal obtained from the pixel according to the determined approximate average value and according to a reference average value common to all the pixels,
- and means for transmitting a corrected signal from the circuit associated with the pixel.

BRIEF DESCRIPTION OF THE DRAWINGS

Other features and benefits of the invention will become apparent from reading the following detailed description which is given with reference to the appended drawings in which.

DESCRIPTION OF PREFERRED EMBODIMENTS

Figure 1:
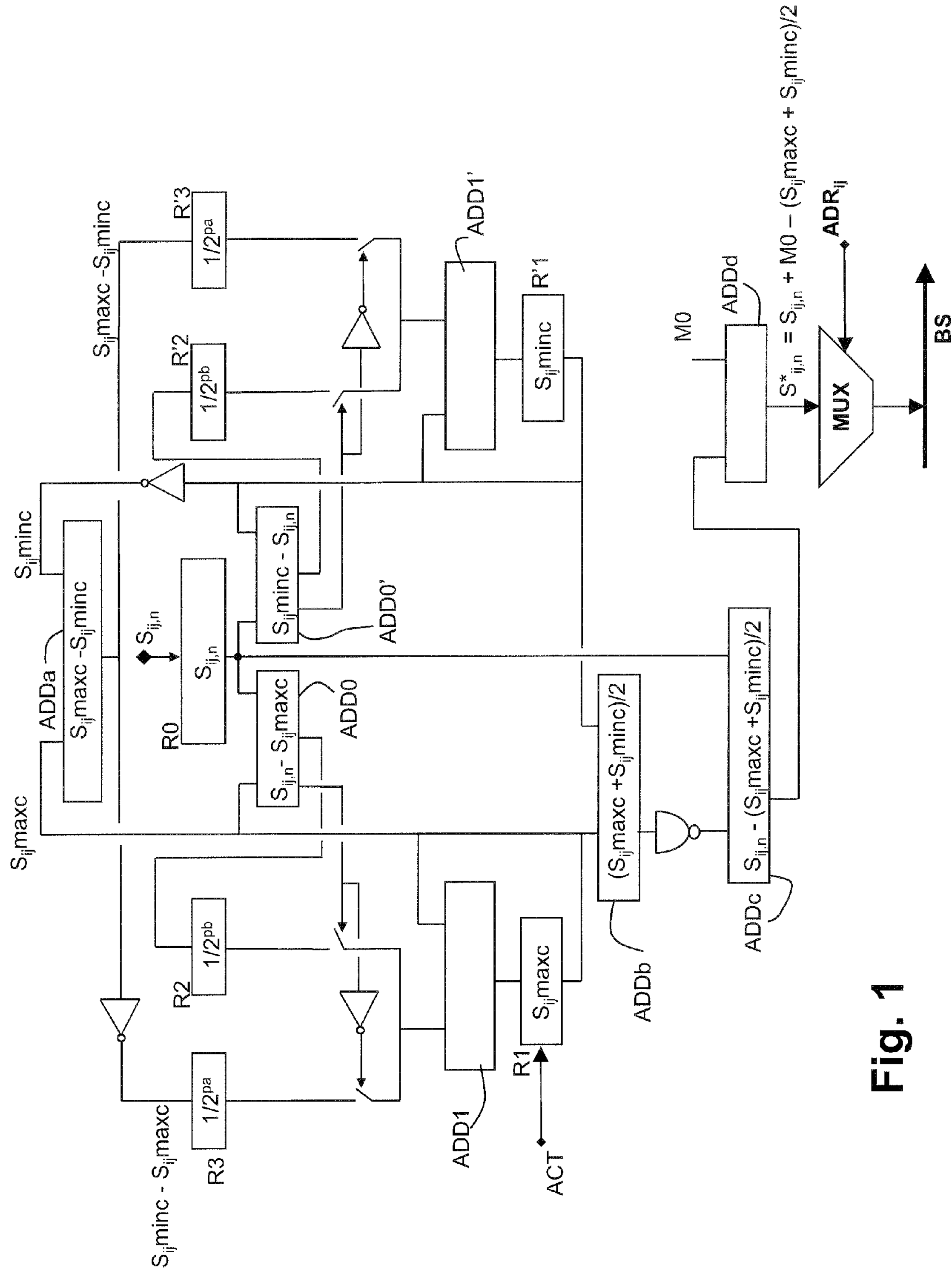
FIG. 1 represents a schematic diagram of the correction circuit used in the invention for an additive correction.

The invention is based on the premise that the statistical temporal distribution of the luminances is indeed the same for all the pixels of the image. In particular, the average luminance level that would have been seen by the pixels of the matrix will be the same for all the pixels; also, the extreme luminance levels (minimum and maximum) have good chances of being the same.

If the basic premise of the invention is borne out, each of the pixels can be corrected in an extremely satisfactory manner by calculating their average and by correcting each signal by the deviation between the average found and a reference value common to all the pixels. If this premise is only approximately borne out, for example because the average has not been calculated over a sufficiently large number of images, the spatial noise will in any case have been considerably improved without involving any manual calibration and without using calibration scenes that have reference luminances, The pixel-by-pixel average calculation for a large number of images is a very cumbersome process. The invention proposes doing a simplified and approximate calculation on each image pixel, so this calculation is not a genuine average calculation, but one that provides a result that is almost equivalent from the point of view of the desired aim; with this approximate calculation, a correction is made at the pixel level so as to directly and instantaneously extract a corrected signal.

The calculation and the correction at the pixel level can be done either in the detection matrix itself, technology permitting (the electronic calculation circuit associated with a pixel being in the immediate vicinity of a photodetector element of the pixel) or in a matrix of associated circuits linked pixel-to-pixel to a matrix of photodetector elements. In this second case, an associated calculation circuit, of rank i,j in the matrix of circuits, receives a signal to be corrected from a photodetector element of rank i,j of the detection matrix and it supplies a corrected signal outside the sensor; circuit hybridization techniques allow this association. In both cases, the signal obtained from the photodetector is corrected before the outside transmission, line by line, of a series of signals corresponding to a complete image.

Additive Correction by the Temporal Average of the Signals from a Pixel

The invention will first be explained in a simple example in which the spatial noise correction comprises only a correction of the signal reference level, to correct the signal from each of the pixels so that all the pixels supply one and the same signal level (after correction) for an average luminance level. This is an additive correction: to correct the signal received by a pixel, a correction value is systematically added or subtracted.

$S_{ij,n}$ designates the signal level obtained from a pixel $P_{ij}$ of rank i by row and j by column, in an nth image of a series of successive images.

An (approximate) average $M_{ij}$ of the signal levels supplied by the pixel $P_{ij}$ is calculated for a series of N images, and this is used to correct the value of the signal $S_{ij,n}$ and supply a corrected value $S^*_{ij,n}$ to the user.

On each new image, an average $M_{ij}$ is recalculated, and it is this average that will be used to correct the signal obtained from a pixel for this image or for the next.

The correction applied to the signal $S_{ij,n}$ is a subtraction of the deviation between the average $M_{ij}$ and a reference value M0 common to all the pixels. The correction is therefore as follows: $S^*_{ij,n}=S_{ij,n}+M0-M_{ij}$.

Consequently, if a pixel statistically supplies a signal whose average value $M_{ij}$ is not equal to the statistical average value M0 of the signals supplied by all the other pixels, it is considered that this pixel has, however, statistically received the same average luminance as all the others and it is therefore because of a different sensitivity that it supplies a different signal. It is corrected systematically by subtracting from it the deviation $M_{ij}-M0$.

Calculating the Average $M_{ij}$ by Median Between Extremes

It is not easy to calculate an average $M_{ij}$ over a very large number of samples since the sum of N samples has to be calculated and this sum has to be divided by N; on each new image, the oldest sample has to be eliminated and replaced by the new sample (which gives a sliding average over the last N samples received); this calculation is all the more cumbersome when N is higher; however, N has to be high for the invention to work well.

To obtain an approximate average value, the median between two extreme luminance values received by a pixel is calculated during the N successive images.

It is therefore considered that the average signal level that a pixel supplies, and that represents an average luminance level, is the half-sum between the weakest signal received by a pixel and the strongest signal received by this pixel. Also, according to the invention, it is considered that all the pixels should receive at least once a very weak luminance level which is the same for all the pixels and a very strong luminance level which is the same for all the pixels; it is also considered that the half-sum of these luminances represents an average luminance level that should be the same for all the pixels.

The proposed correction, approximate but advantageous, then consists in considering that the half-sum of the weakest signal level $S_{ij}$min and of the strongest signal level $S_{ij}$max supplied by a pixel should be a reference value M0 that is identical for all the pixels. If this is not the case, an additive correction is done to subtract from the received signal the difference between the observed half-sum and the reference value M0.

The corrected signal is then $$S^*_{ij,n}=S_{ij,n}+M0-(S_{ij}\text{min}+S_{ij}\text{max})/2$$

The minimum and maximum values are obtained by a recursive calculation so that this calculation can be performed in a small circuit associated with each pixel.

The minimum and maximum values of the signal received by a pixel can be evaluated simply by comparing the value of the received signal with that of a minimum value register and a maximum value register. The content of the minimum value register is replaced by the value of the signal if said value is lower than the content of the register; otherwise, the register remains unchanged. The content of the maximum value register is replaced by the value of the signal if said value is greater than the content of the register; otherwise the register remains unchanged.

However, as indicated hereinbelow, it may be preferable to do a more sophisticated recursive calculation that minimizes the impact of aberrant dots on the minimum or maximum value detected. Also, it may be desirable to provide for the stored extreme values, for each pixel, to tend naturally to be progressively brought toward one another, to take account of these aberrant dots and to take account of progressive drifts, temperature variations, etc.

The following calculation shows how corrected extreme values can be calculated recursively and stored, in place of the true extreme values, to take account of this.

Recursive Calculation of Corrected Extreme Values

The calculation will be demonstrated with respect to the maximum value of the signal received by the pixel. An identical calculation could be done for the minimum value.

$S_{ij}$maxc designates the corrected extreme value, stored in a register and used to correct the current signal instead of the true extreme value $S_{ij}$max that could have been detected. Similarly, $S_{ij}$minc is the corrected minimum extreme value, stored in another register. On the (n−1)th image, the stored values are $S_{ij}\text{maxc}_{n-1}$ and $S_{ij}\text{minc}_{n-1}$.

If the current signal $S_{ij,n}$ of an image is greater than the stored value, the stored value is modified to add to it a fraction 1/B of the difference between the current value and the stored value, and not all of this difference as would be done if the aim was to store the true extreme value. The value of B, preferably a power of two $2^{pb}$ to simplify the digital calculation circuits, must be large enough to eliminate the impact of aberrant dots, not too large to avoid generating an establishing time constant that is too great at the outset. B can typically be chosen between 1 and $2^8$.

The new corrected high value is, in this first case:

$$S_{ij}\text{maxc}_n=S_{ij}\text{maxc}_{n-1}+(S_{ij,n}-S_{ij}\text{maxc}_{n-1})/B$$

If, on the contrary, the current signal is less than the stored value, a small value is subtracted from the content of the register, preferably a value $(S_{ij,}\text{maxc}-S_{ij}\text{minc})/A$ so that the content of the register is progressively reduced if the overshoot of its value occurs only rarely. The value A, preferably a power of two $2^{pa}$, must be much greater than the value of B: typically between $2^8$ and $2^{14}$.

The new corrected high value is, in this second case:

$$S_{ij}\text{maxc}_n=S_{ij}\text{maxc}_{n-1}-(S_{ij}\text{maxc}_{n-1}-S_{ij}\text{minc}_{n-1})/A$$

Thus, the impact of an aberrant dot will only be limited, and only if high values are reproduced often enough will they ultimately define a maximum value to be stored. Otherwise, the stored extreme value is reduced slowly (time constant of a few minutes if A is equal to $2^{12}$ to $2^{14}$ for 50 images per second).

The content of the register does not therefore truly represent a detected extreme value, but a kind of recurrent high value reached often enough by the pixel and which, for the requirements of correcting and eliminating the fixed image noise, is perfectly usable.

Similarly, a low value register would contain a kind of recurrent low value reached often enough by the pixel. The algorithm is symmetrical to the preceding one: in the event of a downward overshoot of the register, a fraction 1/B of the difference between the signal and the content of the register is added to the stored value; should there be no overshoot, the same small difference $(S_{ij}\text{maxc}_{n-1}-S_{ij}\text{minc}_{n-1})/A$ is added to the stored value.

Since these high and low values $S_{ij}$maxc and $S_{ij}$minc are obtained by the same calculation for all the pixels, it will be understood that they can statistically be used as a basis for correcting the dispersions of the pixels instead of the true extreme values.

Correcting a pixel therefore consists in applying the following formula:

$$S^*_{ij,n}=S_{ij,n}+M0-(S_{ij}\text{minc}+S_{ij}\text{maxc})/2$$

Applying the Correction by the Median Between Extremes

The description of an implementing circuit is given hereinbelow for the more complex case in which high and low corrected extreme values are used as indicated in the preceding section entitled "Recursive calculation of corrected extreme values".

FIG. 1 represents an individual circuit, associated with a single pixel $P_{ij}$ of the shooting matrix, capable of correcting the signal obtained from this pixel based on the approximate average of the signals obtained from this pixel over a large number of images. The circuit performs the recursive digital calculation indicated hereinabove. There are as many circuits as there are pixels.

The digitized signal $S_{ij,n}$ obtained from the pixel $P_{ij}$ and corresponding to the nth image is contained in an input register R0. The corrected signal $S^*_{ij,n}$ leaves via an output bus BS.

The left-hand part of the figure represents the circuit for determining the corrected high value; the right-hand part represents the preparation of the corrected low value; the bottom part represents the calculation of the average (half-sum of the corrected extremes) and the correction made to the signal.

A register R1 contains the current corrected high value $S_{ij}$maxc. An adder ADD0 receiving the outputs from the registers R0 and R1 calculates the difference between the signal obtained from the pixel $S_{ij,n}$ and the high value $S_{ij}$maxc. This difference can be divided by $2^{pb}$, by virtue of a register R2, the function of which is simply to offset to the right the value that it receives by pb bits, which is equivalent to a division by $2^{pb}$. The register R2 therefore contains the value $(S_{ij,n}-S_{ij}maxc_{n-1})/2^{pb}$ which is an incrementation value to be applied to the stored high value if the signal exceeds the stored high value.

The high order bit of the output from the adder ADD0 indicates whether the signal $S_{ij,n}$ is greater than the stored high value $S_{ij}$maxc, and in this case the output from the register R2 will be used and applied to an adder ADD1. Otherwise, it is the output from a register R3, containing the value $(S_{ij}minc_{n-1}-S_{ij}maxc_{n-1})/2^{pa}$ that will be applied to the adder ADD1. This choice is dictated by a controlled switching by the high order bit of the output of the adder, to 0 if the difference $(S_{ij,n}-S_{ij}maxc_{n-1})$ is positive, to 1 if it is negative.

The adder ADD1 includes an input that receives the output of this switching and therefore the content of the register R2 or that of the register R3; it includes another input that is linked to the output of the corrected high value register R1 containing $S_{ij}$maxc. The output of the adder ADD1 is linked to the input of the register R1 to be able to place a new content in the latter.

The circuit is the same on the right-hand part, for the calculation of the corrected low value $S_{ij}$minc. The same elements are designated by the same references. There are small differences because of the fact that certain signs have to be inverted and this is why inverters are represented (for example, the difference $(S_{ij}maxc_{n-1}-S_{ij}minc_{n-1})/2^{pa}$ must be added and no longer substrated. The register R'1 contains the value $S_{ij}$minc and not $S_{ij}$maxc. The adders ADD'0 and ADD'1 receive $S_{ij}$minc and not $S_{ij}$maxc.

An adder ADDa receives the content of the register R1 and the opposite of the content of the register R'1 to establish the difference ($S_{ij}$maxc−$S_{ij}$minc) and apply it to the registers R3 and R'3.

An adder ADDb receives the contents of these same registers R1 and R'1 to establish the half-sum ($S_{ij}$maxc+$S_{ij}$minc)/2.

An adder ADDc receives the signal $S_{ij,n}$ and the opposite of the half-sum obtained from the adder ADDb, to establish the difference $S_{ij,n}$−($S_{ij}$minc+$S_{ij}$maxc)/2.

Finally, an adder ADDd receives the difference obtained from the adder ADDc and the reference median M0 (common to all the pixels), to establish the corrected signal $S^*_{ij,n}$ such that:

$$S^*_{ij,n}=S_{ij,n}+M0-(S_{ij}\text{minc}+S_{ij}\text{maxc})/2$$

The high and low corrected extreme value registers, R1 and R'1, are reupdated on each new image to take new values. They therefore include an updating input ACT. The updating takes place, for example, at the end of an image exposure time for all the pixels at once. After updating, these registers contain new values that can be used in the adders ADDb and ADDc to correct the signal $S_{ij,n}$.

The result of the addition, that is to say the corrected signal $S^*_{ij,n}$, is supplied by the adder ADDc, through a multiplexer MUX controlled by an address bus. The corrected signal is sent only if the address $ADR_{ij}$ of the pixel $P_{ij}$ arrives via the address bus. The multiplexer handles the serialization on the output bus BS of the successive signals corresponding to each pixel.

Multiplying Correction by Luminance Slope Deviation

Besides the average of the time distribution, provision can be made to use a second statistical characteristic of the time distribution of the signals obtained from a pixel. More specifically, it is now possible to try to make a multiplying correction to the value of the signal. This multiplying correction is preferably made after additive correction of the signal by the average value, by applying a gain $G_{ij}$ to the corrected signal from the pixel $P_{ij}$, or, more exactly, to the difference between the corrected signal $S^*_{ij}$ and the desired average M0.

Thus, if a corrected signal $S^*_{ij,n}$ is established from the current signal, based on the formula $S^*_{ij,n}=S_{ij,n}+M0-M_{ij}$, a doubly corrected signal $S^{}_{ij,n}$ will now be established, such that $$(S^{}_{ij,n}-M0)=G_{ij}\cdot(S^*_{ij,n}-M0)$$

The formula above is given as a general formula. If the signals are coded positively and negatively about an average value M0 taken by definition to be equal to zero, this operation is a simple multiplication of the signal by the gain $G_{ij}$. If, on the other hand, the average M0 is not a zero reference, the complete formula must be used and this multiplying correction of the signal $S^*_{ij}$ also naturally includes an additive term that is equal to $M0[1-G_{ij}]$.

The gain $G_{ij}$ to be applied is calculated from the observation of an average slope of variation of the signal according to the luminance. If the pixels have different slopes of variation, then there will a fixed noise pattern linked to the particular features of the individual pixels. It is therefore desirable to determine the average slope, to determine its deviation relative to a reference slope, and to correct the signal by applying a gain corresponding to the ratio between the desired slope and the observed actual slope.

The observed slope can be determined by observing the deviation between extremes $S_{ij}$max−$S_{ij}$min, or else the deviation between corrected extremes $S_{ij}$maxc−$S_{ij}$minc, the values $S_{ij}$maxc and $S_{ij}$minc being calculated as indicated previously in the section entitled "Recursive calculation of corrected extreme values". In practice, this deviation is also representative of a slope of variation according to luminance: if the deviation varies between two pixels, whereas all the pixels should statistically have the same extreme luminances after a certain number of images, then their slopes of variation according to luminance are not the same.

If the observed deviation is $E_{ij}$ and the theoretical setpoint deviation is E0 (the same for all the pixels), the gain to be applied is $G_{ij}=E0/E_{ij}$.

The doubly-corrected signal, corrected additively and multiplicatively, is then:

$$S^{**}_{ij,n}=(E0/E_{ij}).S^{*}_{ij,n}+[1-(i\ E0/E_{ij})].M0$$

therefore $$S^{**}_{ij,n}=(E0/E_{ij})[S_{ij,n}+M0-M_{ij}]+[1-(E0/E_{ij})].M0$$

or else:

$$S^{**}_{ij,n}=(E0/E_{ij}).S_{ij,n}-(E0/E_{ij}).M_{ij}+M0$$

It will be understood that it would obviously be possible to reverse the multiplying correction and additive correction operations, by directly multiplying the signal $S_{ij,n}$ obtained from the pixel by the gain $E0/E_{ij}$, the single additive correction then being equal to $M0-(E0/E_{ij}).M_{ij}$.

The circuit associated with the pixel then comprises the elements needed to perform not only additions and subtractions but also multiplications and divisions.

It will be noted that it may be desirable to give a floor value to the deviation between extreme values (corrected or uncorrected), that is to say it may be desirable to prevent the deviation used in the above formula falling below a certain value. In other words, if the observed deviation (corrected or uncorrected) is too small, it is replaced by the floor value to perform the gain calculation. This avoids applying too great a gain for pixels that have too weak a slope of signal variation according to luminance.

Figure 2:
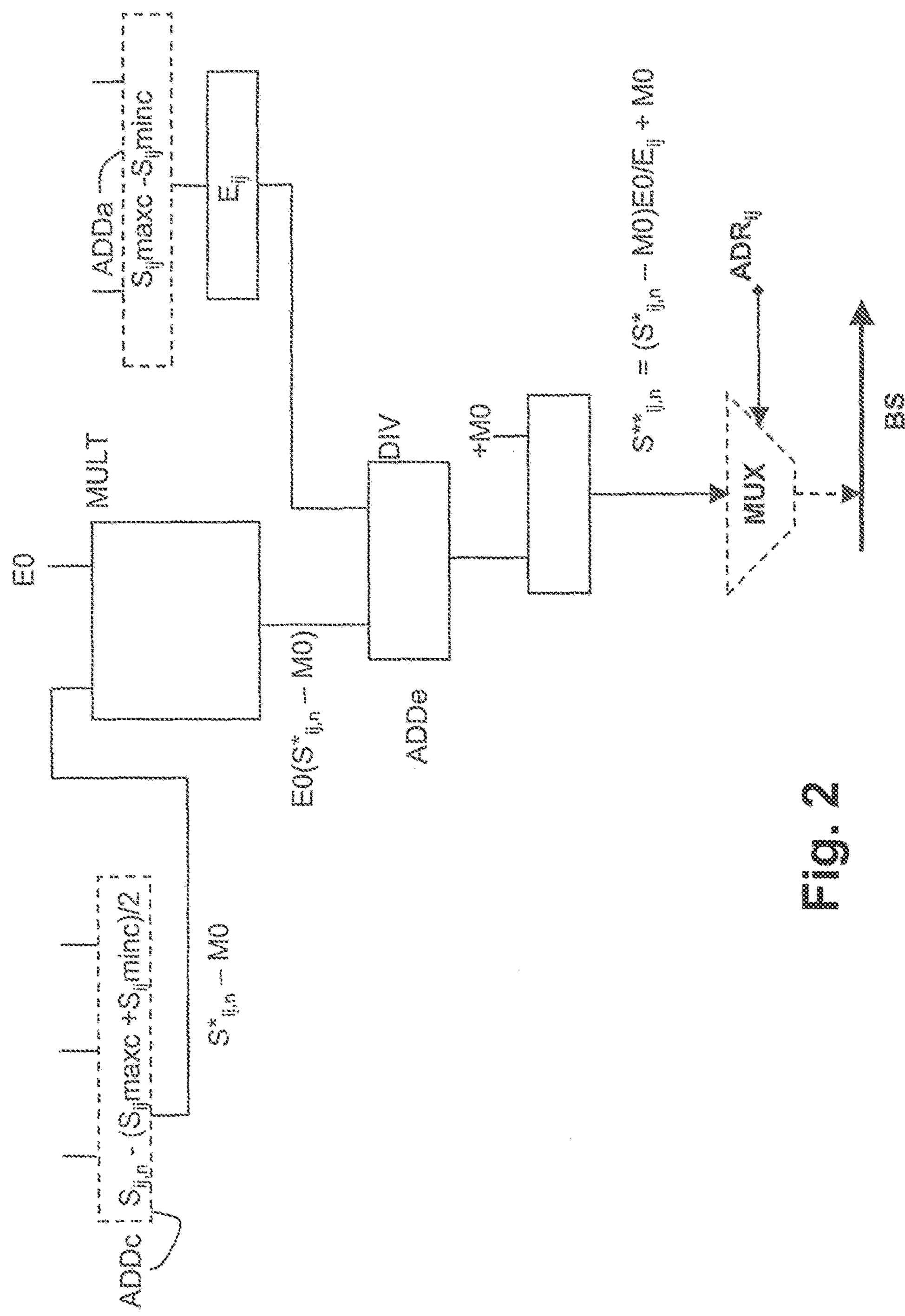
FIG. 2 represents a circuit extension in the case of an additive and multiplying correction.

To implement this calculation, the diagram of FIG. 1 can, for example, be complemented with that of FIG. 2: to go back to the output from the adder ADDc, the multiplication by E0 of a value that is equal to $S^{*}_{ij,n}-M0$ is performed in a multiplication circuit MULT.

This value is divided, in a divider DIV, by the content of a register that contains the deviation between corrected extremes $S_{ij}maxc-S_{ij}minc$, this value representing a deviation $E_{ij}$ in the slope correction calculation.

The result of the division is a value $(S^{*}_{ij,n}-M0)E0/E_{ij}$. By adding M0 to this value in an adder ADDe, the signal $S^{**}_{ij}$ is produced both additively and multiplicatively.

Applying the Correction at Pixel Level

The diagram of FIG. 1 assumes that the signal $S_{ij}$ to be corrected arrives in an input register R0 in digital form, in order to be digitally corrected. This digital signal can originate from an analog-digital conversion, in the pixel or in the correction circuit associated with the pixel, of a current or of an analog voltage obtained from the photodetector.

Hybrid circuit architectures can make it possible for this to be done, for example, with a photosensitive pixel on a chip facing an electronic processing circuit on another chip. The chips are brought together and direct electrical connections are established between a pixel and its associated calculation circuit. It will be possible to also envisage having the analog-digital conversion as well as the correction calculation performed in the pixel itself, technology permitting, provided that there is sufficient space to house the electronic correction calculation circuits in the available space allotted to each pixel.

The digital signal obtained from the pixel can also be obtained directly by direct digital counting: it is possible for example to make a photodetection element that supplies a charge current, which is converted into pulses with a frequency proportional to the lighting. A counter, in the pixel, counts the pulses during the exposure time, so that the content of the counter represents, directly in digital form, the lighting dose received during the exposure time. It is this content that then forms the signal $S_{ij}$ obtained from the pixel, to be corrected by the associated correction circuit. The register R0 of FIGS. 1 and 2 is then quite simply this counter.

The invention claimed is:

1. A method of processing signals obtained from the pixels of a matrix image sensor, this method comprising the follow steps:

a. a signal obtained from each pixel during a large number of successive images is collected;

b. for each pixel, an approximate value of an average of the signal obtained from the pixel during this large number of images is determined;

c. the signal obtained from each pixel is instantaneously corrected according to the determined approximate average value and a reference average value common to all the pixels; and d. a corrected signal is transmitted from a circuit associated with the pixel, wherein the approximate average value is obtained by determining a high and a low limit value taken by the signal obtained from the pixel during the large number of images, and by calculating a central value between these high and low limit values.

2. The processing method as claimed in claim 1, wherein a calculation of the approximate average value and the correction of the signal are performed, for each pixel, in an individual electronic circuit associated with the pixel, and the corrected signals corresponding to each pixel are extracted from a matrix of associated circuits.

3. The processing method as claimed in claim 1, wherein the high and low limit values are calculated digitally by a recursive method.

4. The processing method as claimed in claim 3, wherein the high limit value used in calculating the approximate average value is obtained by comparing an uncorrected signal value obtained from each pixel with content of a high limit value register and by replacing the content of the high limit value register with the uncorrected signal value if said uncorrected signal value is greater than the content of the high limit value register, and the low limit value is obtained by comparing the uncorrected signal value obtained from each pixel with content of a low limit value register and by replacing the content of the low limit value register with the uncorrected signal value if said uncorrected signal value is smaller than the content of the register.

5. The method as claimed in claim 3, wherein the high or low limit value is obtained by the following algorithm:

a. if an uncorrected signal value obtained from a pixel is greater than the high limit value or less than the low limit value, the high or low limit value are modified respectively to add to them a fraction of a difference between the uncorrected signal value and the respective high or low limit value; and b. if the uncorrected signal value is less than the high limit value or greater than the low limit value, a fraction of a difference between the high and low limit values is subtracted from the respective high or low limit value.

6. The processing method as claimed in claim 1, wherein the approximate average value is a half-sum of the high and low limit values.

7. The processing method as claimed in claim 1, wherein the correction comprises an addition to the signal obtained from the pixel of a difference between the reference average value and the approximate average value.

8. The processing method as claimed in claim 1, wherein the correction of the signal obtained from the pixel further comprises a multiplying correction using a multiplying coefficient which modifies a slope of variation of the signal obtained from the pixel with luminance, the multiplying coefficient being a ratio between a desired difference between the high and low limit values and an actual difference between the high and low limit values.

9. A matrix image sensor comprising, for each pixel, an individual digital circuit associated with the pixel, this individual circuit comprising:

a. means for calculating an approximate average value of the signal obtained from the pixel during a large number of preceding images, the approximate average value being obtained by determining high low limit values taken by the signal obtained from the pixel during the large number of images and by calculating a central value between these high and low limit values; and b. means for correcting the signal obtained from the pixel according to the determined approximate average value and according to a reference average value common to all the pixels; and c. means for transmitting a corrected signal from a circuit associated with the pixel.

10. The matrix image sensor as claimed in claim 9, comprising a circuit for calculating a half-sum of the high and low limit values.

* * * * *